United States Patent
Habash

(10) Patent No.: US 9,116,560 B1
(45) Date of Patent: Aug. 25, 2015

(54) TOUCH PEN WITH HAPTIC FEEDBACK

(71) Applicant: Abduljalil K H Habash, Bayan (KW)

(72) Inventor: Abduljalil K H Habash, Bayan (KW)

( * ) Notice: Subject to any disclaimer, the term of this patent is extended or adjusted under 35 U.S.C. 154(b) by 0 days.

(21) Appl. No.: 14/727,749

(22) Filed: Jun. 1, 2015

(51) Int. Cl.
*G06F 3/041* (2006.01)
*G06F 3/0354* (2013.01)
*G06F 3/01* (2006.01)

(52) U.S. Cl.
CPC ............ *G06F 3/03545* (2013.01); *G06F 3/016* (2013.01); *G06F 3/0414* (2013.01)

(58) Field of Classification Search
None
See application file for complete search history.

(56) References Cited

U.S. PATENT DOCUMENTS

| | | | |
|---|---|---|---|
| 8,619,042 B2 | 12/2013 | Taniuchi | |
| 8,619,064 B2 | 12/2013 | Knee | |
| 8,773,403 B2 | 7/2014 | Adhikari | |
| 2001/0028345 A1 | 10/2001 | Natsuyama et al. | |
| 2004/0150632 A1 | 8/2004 | Clapper | |
| 2012/0293464 A1* | 11/2012 | Adhikari | 345/179 |
| 2013/0321359 A1 | 12/2013 | Zeliff et al. | |
| 2015/0054635 A1* | 2/2015 | Saddik et al. | 340/407.2 |

FOREIGN PATENT DOCUMENTS

CN 103885615 A 6/2014

* cited by examiner

*Primary Examiner* — Joseph Haley
(74) *Attorney, Agent, or Firm* — Richard C Litman

(57) ABSTRACT

The touch pen with haptic feedback includes a first ball configured for communicating with a touch-sensitive surface, a body having a first opening configured for retaining the first ball, a second ball bearing against the first ball, the second ball being configured for controlling the movement of the first ball along the touch-sensitive surface, an inverted cradle including a plurality of arms, each of the plurality of arms having a first end and a second end, and a plurality of third balls, the third balls mounted on the second end of a corresponding one of the arms, the plurality of third balls bearing against the second ball. The plurality of third balls is configured for improving haptic feedback and accuracy when the first ball is in communication with the touch-sensitive surface.

13 Claims, 5 Drawing Sheets

TOUCH PEN WITH HAPTIC FEEDBACK

BACKGROUND OF THE INVENTION

1. Field of the Invention

The present invention relates to touch pens, and particularly to a touch pen with haptic feedback for use with any touch-sensitive surface.

2. Description of the Related Art

Currently, there are wide variety of touch pens, also known as styluses, for electronic devices, such as smartphones, tablets, computer screens, and advanced graphic designing panels having touch-sensitive surfaces. However, the touch pens currently on the market typically fail to provide a user with the accuracy and the haptic feedback that a ball point pen provides when writing on a traditional surface, such as a notepad.

Various attempts have been suggested to improve the accuracy and the haptic feedback of touch pens, such as providing the touch pens with a more pointy edge or adding a transparent plastic on the edge of the touch pen so that the user can see where the tip of the touch pen meets the touch sensitive surface. Despite the myriad of touch pens currently available, each having a different configuration and a different set of features, none seem to address the underlying problem of configuring a touch pen to provide the same feel and accuracy on a touch-sensitive surface that a ball point pen provides when writing on a traditional surface.

Thus, a touch pen with haptic feedback solving the aforementioned problems is desired.

SUMMARY OF THE INVENTION

The touch pen with haptic feedback includes a first ball configured for communicating with a touch-sensitive surface, a body having a first opening configured for retaining the first ball, a second ball bearing against the first ball, the second ball being configured for controlling the movement of the first ball along the touch-sensitive surface, an inverted cradle including a plurality of arms, each of the plurality of arms having a first end and a second end, and a plurality of third balls, the third balls mounted on the second end of a corresponding one of the arms, the plurality of third balls bearing against the second ball. The plurality of third balls is configured for improving haptic feedback and accuracy when the first ball is in communication with the touch-sensitive surface.

The touch pen also includes a plunger having a plunger tip bearing against the inverted cradle, the plunger being configured for applying pressure onto the second ball through the third balls to adjust the degree of haptic feedback through a button on the side of the pen's body. The second ball applies an initial bias pressure to the first ball. When the pen is placed against a touch-sensitive screen, the first ball pushes the second ball upward, extending the arms of the cradle outward to alter the haptic feedback. When the pen is removed from the touch-sensitive screen, bias springs contract the cradle, returning the second ball to its initial position.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
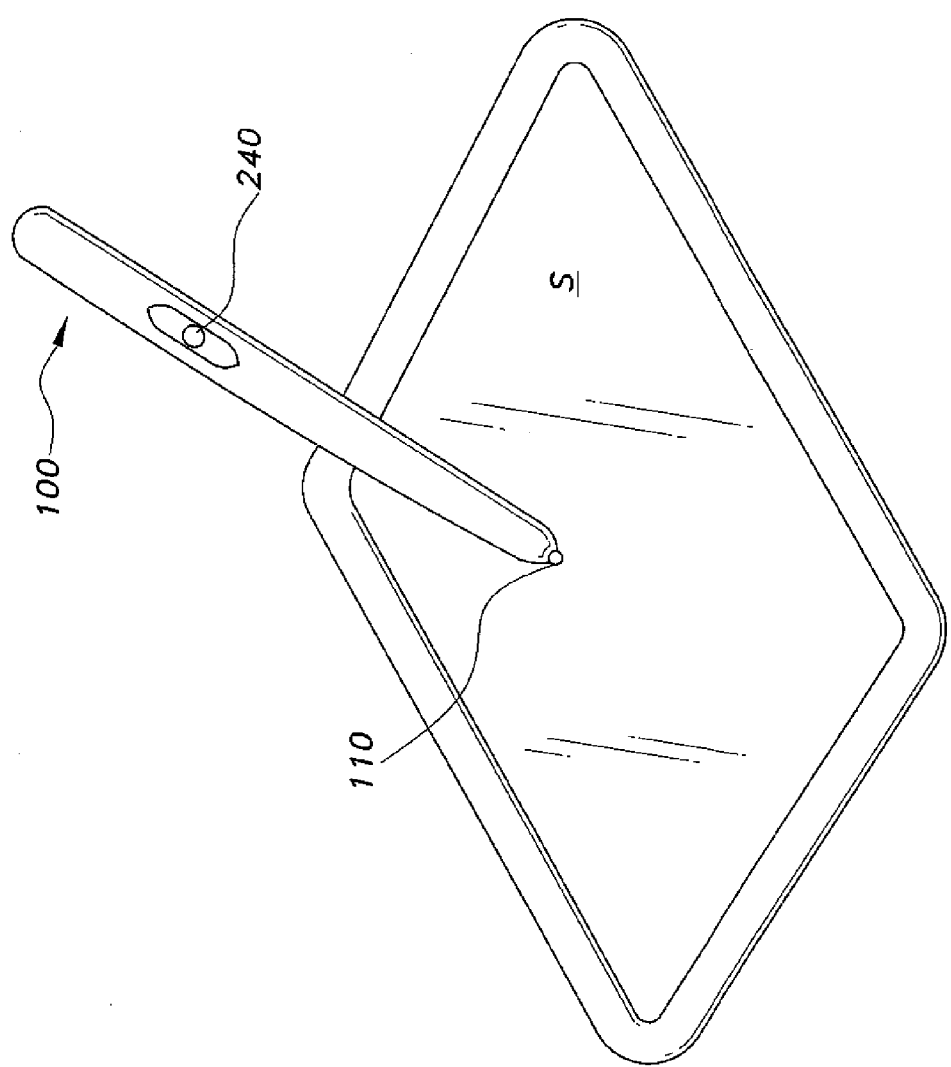
FIG. 1 is an environmental, perspective view of a touch pen with haptic feedback according to the present invention.
Figure 2:
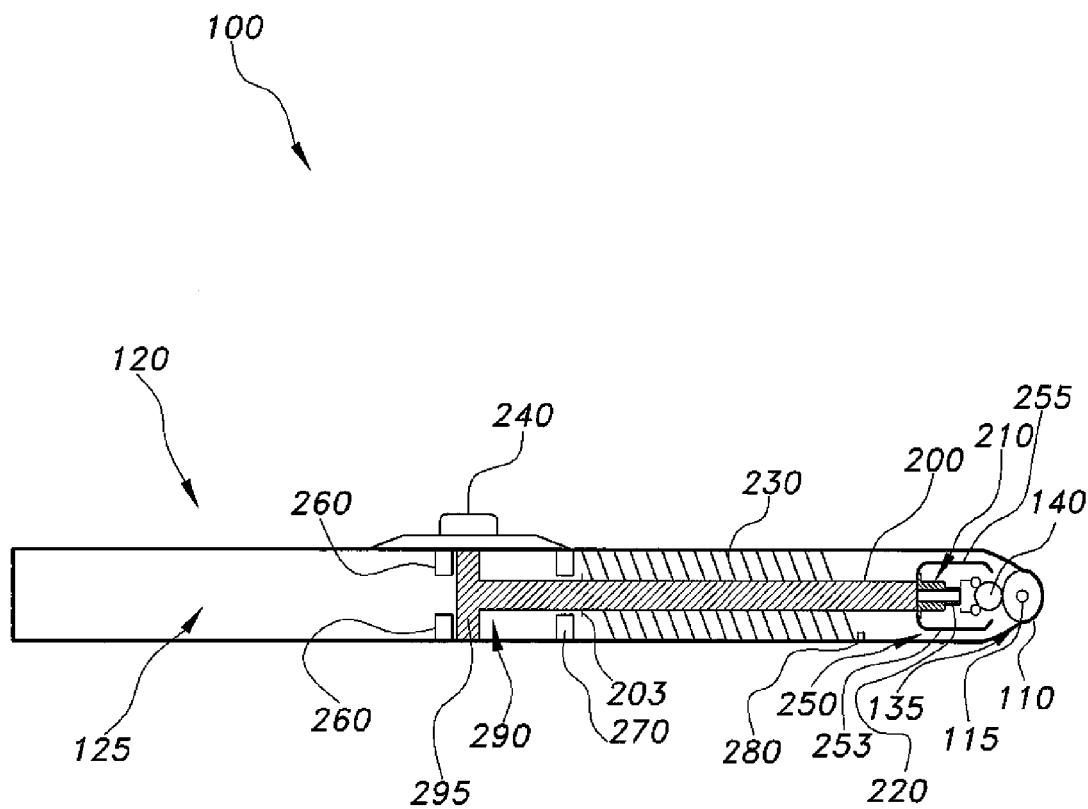
FIG. 2 is a side view in section of a touch pen with haptic feedback according to the present invention.

Referring to FIGS. 1-5 a touch pen 100 with haptic feedback is generally illustrated. As shown in FIG. 1, the touch pen 100 includes a first ball 110 configured for communicating with a touch-sensitive surface S, a body 120 having a first opening 135 configured for retaining the first ball 110, and a side button 240 for adjusting the normal bias pressure of the first ball 110. As shown in FIG. 2, the body 120 houses a second ball 140 bearing against the first ball 110. The second ball 140 is configured for controlling the movement of the first ball 110 along the touch-sensitive surface S. The body 120 also houses an inverted cradle, such as inverted cradle 160a (shown in FIGS. 3A and 3B) or inverted cradle 160b (shown in FIGS. 4A and 4B), the cradle including a plurality of arms 170. Each of the arms 170 has a first end 175 and a second end 180. A plurality of third balls 150 (preferably eight third balls 150) is mounted on the second end 180 of a corresponding arm 170. The third balls 150 bear against the second ball 140. The inverted cradle 160a or 160b is configured for improving haptic feedback and accuracy when the first ball 110 is in communication with the touch-sensitive surface S.

The touch pen 100 includes a plunger 200 having a lower end 210 including a plunger tip 220 bearing against the cradle adjacent the first end 175 of each of the arms 170 of the inverted cradle 160a-160b, as shown in FIGS. 3A-4B. The plunger 220 is configured for applying an initial bias pressure onto the second ball 140 through the cradle arms 170 and the third balls 150 to adjust the sensitivity of the haptic feedback. As shown in FIG. 2, a bias spring (e.g., a helical compression spring coaxially mounted on the plunger 220) or resilient member 230 is configured for retracting the plunger tip 220 away from the first opening 135 and maintaining the initial bias pressure. A control button 240 is disposed on the body 120. The control button 240 is arranged in communicating relation with the plunger 200 (e.g., by a connector arm attached to the button 240 and to the plunger 200, the connector arm extending through a slot defined in the body 120) and configured for controlling the force applied to the touch-sensitive surface S by the first ball 110 by extending or retracting the plunger 200 as desired. A guide mechanism 250 is configured for maintaining the alignment of the first ball 110, the second ball 140, and the plurality of third balls 150 while the first ball 110 is in communication with the touch-sensitive surface S.

The first ball 110 can be formed from any type of material, such as metal 115 encapsulated in rubber, suitable to communicate with the touch sensitive surface S, such as a touch-sensitive surface on a smartphone, tablet, computer, and on an advanced graphic designing panel. The first ball 110 can include an inner portion 115, such as a metal ball, having a rubber covering, such as illustrated in FIGS. 3A-4B. Further, the first ball 110 can have any suitable diameter to correspond to any of the various types of touch-sensitive surfaces, such as capacitive screens, resistive screens, and/or smart screens. The second ball 140 can be formed from plastic, such as a porous plastic, that can provide a resistant surface to control the movement or rotation of the first ball 110 while the first ball 110 moves along the touch-sensitive surface S.

The body 120 can have any type of configuration, such as an elongated configuration, suitable for a user of the touch pen 100 to write on the touch-sensitive surface S, and can be formed from any type of suitable material, such as hard plastic or aluminum. The body 120 has a hollow interior portion 125 having at least one first limit stop 260, at least one second limit stop 270, and a third limit stop 280, the second limit stop 270 being interposed between the first limit stop 260 and the third limit stop 280, as illustrated in FIG. 2. Further, the body 120 includes a head portion 130, which may be detachable. The head portion 130 defines the first opening 135, which is configured for retaining the first ball 110. The head portion 130 may be detachable from the body 120 in order to remove and/or clean components positioned in the interior portion 125 of the touch pen 100, including the first ball 110, the second ball 140, and/or the plurality of third balls 150.

Figure 3A:
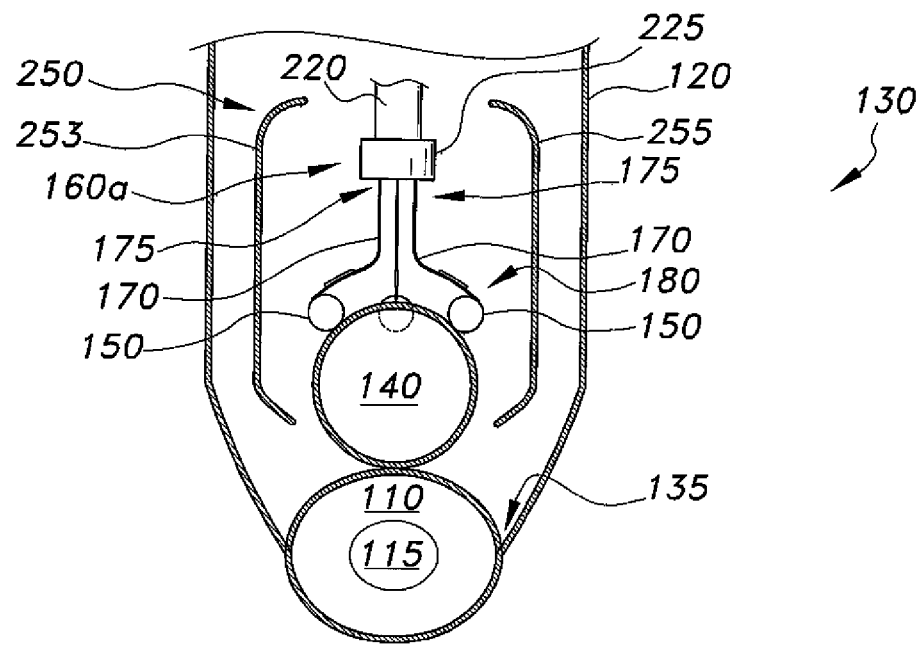
FIG. 3A is a partial side view in section of a head portion of a touch pen with haptic feedback according to the present invention, illustrating an inverted cradle having a plurality of arms in a contracted position.
Figure 3B:
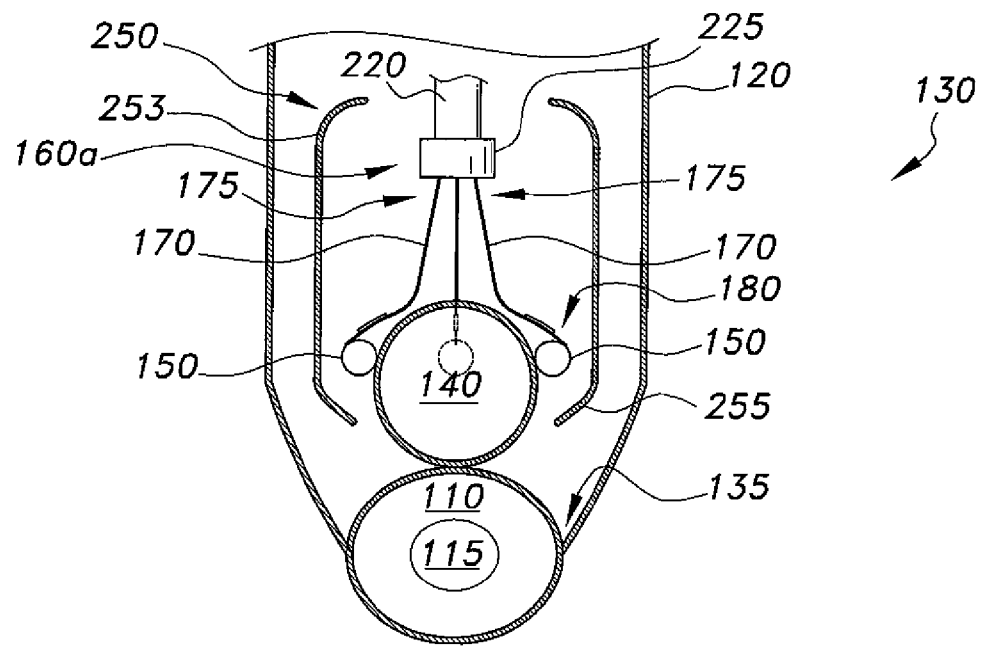
FIG. 3B is a partial side view in section of the head portion of FIG. 3A, illustrating the inverted cradle with the plurality of arms in an extended position.

The inverted cradle 160a or 160b can have any type of suitable configuration that will allow the first ball 110 to write and/or draw on the touch sensitive surface S from any suitable angle, such as an angle in the range between 45° to 90°. The plurality of arms 170 included in the inverted cradle 160a can be formed from any suitable type of resilient material, such as a rubber-like or a spring steel material, that can allow the plurality of arms 170 to extend radially around the second ball 140 when the second ball 140 is pressed against the third balls 150 as the user moves the pen across the touch-sensitive surface, as illustrated in FIG. 3B, and to contract when the pressure is relieved, as illustrated in FIG. 3A, thereby imparting haptic feedback. It is to be noted that the first end 175 of each of the plurality of arms 170 of the inverted cradle 160a can be coupled to the plunger 220 by any suitable means, such as sliding the plunger 220 against a cradle hub 225, the first end of the arms being attached to the hub 225.

Figure 4A:
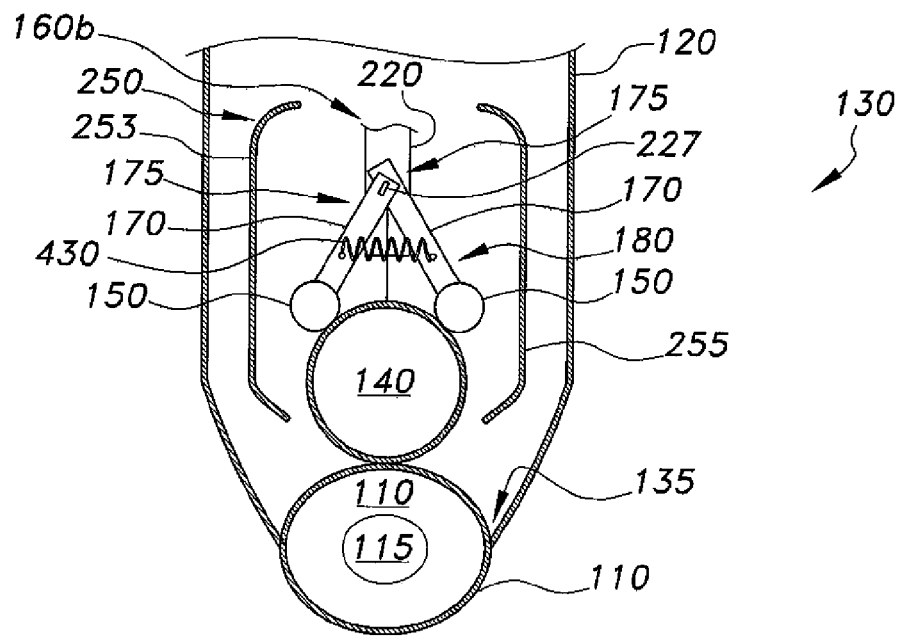
FIG. 4A is a partial side view in section of the head portion of a touch pen with haptic feedback according to the present invention, illustrating an alternative embodiment of an inverted cradle with the plurality of arms in a contracted position.
Figure 4B:
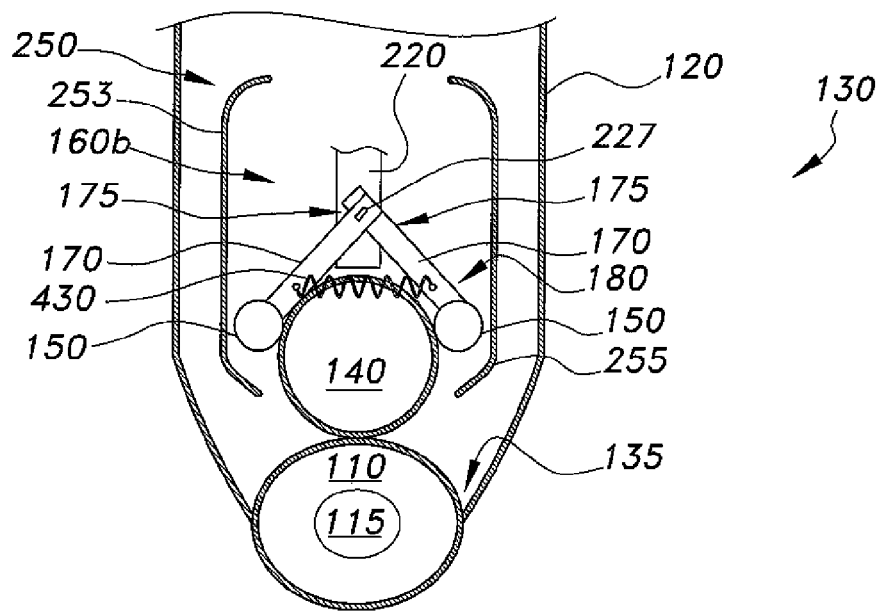
FIG. 4B is a partial side view in section of the head portion of FIG. 4A, illustrating the inverted cradle with the plurality of arms in an extended position.

Alternatively, the inverted cradle 160b can include a plurality of internal springs 430 positioned between an opposing pair of arms 170, as illustrated in FIGS. 4A and 4B. It is to be noted that the first end 175 of each of the plurality of arms 170 of the inverted cradle 160b can be coupled to the hub 225 by any suitable means, such as a fastener 227. The plurality of internal springs 430 can allow the plurality of arms 170, which can be formed from a hard, non-resilient material, to extend radially around the second ball 140 as upward pressure is exerted on the inverted cradle 160b through the third balls 150, as illustrated in FIG. 4B, and contract when the pressure is relieved, as illustrated in FIG. 4A. It is to be noted the when the second ball 140 is in its normal lowered position, as illustrated in FIGS. 3A and 4A, less vibration and/haptic feedback is provided to the user, while greater vibration and/haptic feedback is provide to the user when the second ball 140 is pushed upward so that the third balls 150 are spread radially around the second ball 140, as illustrated in FIGS. 3B and 4B, which occurs when the user pushes the first ball 110 against the touch-sensitive screen S.

In either embodiment, the inverted cradle 160a, 160b defines a cone having its apex at the central hub and an expandable/contractible base, the third balls 150 defining the circumference of the base. The initial tension is defined by sliding the control button 240 to lower the plunger 220 and the cone defined by the cradle 160a, 160b, thereby partially expanding the base of the cone defined by the third balls. When the users places the surface contact or first ball 110 against the touch-sensitive surface S or screen, the first ball 110 moves the bearing or second ball 140 upward through the base of the cone, thereby expanding the base as the distal or second end of the arms 170 extend radially, altering haptic feedback mediated through the cradle 160a, 160b. In order to permit the base of the cone to expand and contract, the arms 170 may be resiliently attached to the hub 225 or pivotally attached to the hub 225.

Figure 5:
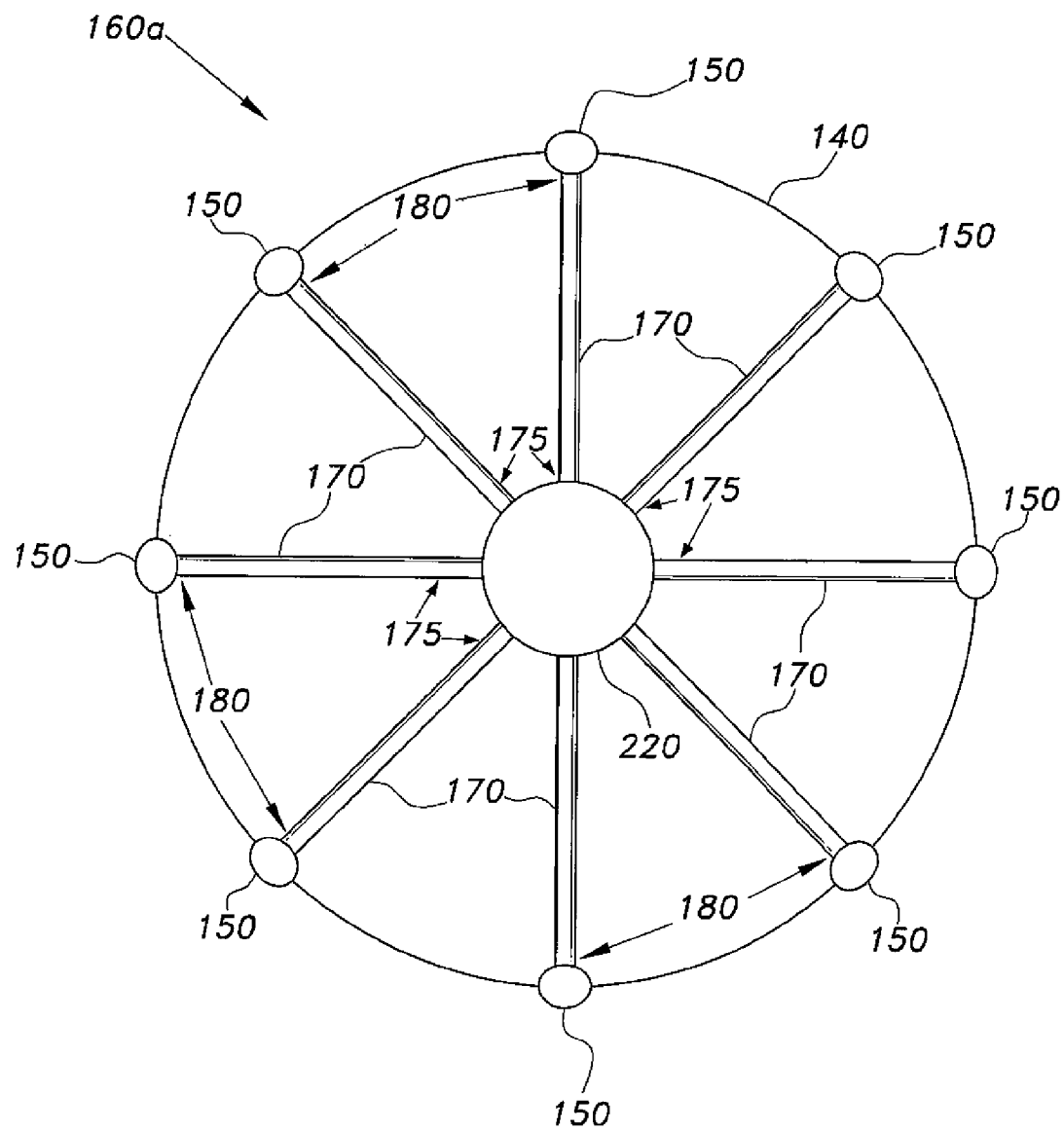
FIG. 5 is a top view of an inverted cradle for a touch pen with haptic feedback according to the present invention, illustrating the plurality of arms in an extended position and having a plurality of third balls bearing against the second ball.

It is to be noted that the second end 180 of each of the plurality of arms 170 can have any type of suitable shape, such as a cup having a "C" shape, in order to hold one of the thirds balls 150 in place, such as when each of the plurality of third balls 150 are in contact with the second ball 140, as illustrated in FIG. 5. Each of the third balls 150 is mounted onto the second end 180 of a corresponding arm 170 by any suitable means that allows the third ball 150 to rotate while the first ball 110 of the touch pen 100 is writing and/or drawing on the touch-sensitive surface S. Further, each of the third balls 150 can be formed from any suitable material, such as rubber, such that when each of the plurality of third balls 150 interacts with the second ball 140, the interaction produces minimal resistance and allows the second ball 140 to move or rotate freely as the first ball 110 is moving along the touch-sensitive surface S to write and/or draw on the touch-sensitive surface S.

The first ball 110, the second ball 140, and the plurality of third balls 150 can be arranged in any suitable configuration, such as in a linear configuration or a diagonal configuration, inside the body 120, as illustrated in FIGS. 2 through 4B, to improve the haptic feedback and/or the accuracy of the touch pen 100. It is to be noted that the first ball 110 can rotate to write and/or draw on the touch-sensitive surface S. This rotation can, in turn, cause the second ball 140 and each of the plurality of third balls 150 to rotate.

The plunger 200 positioned inside the body 120 can be made from any suitable material, such as hard plastic or aluminum. The plunger can include an upper end 290 having a flange 295 interposed between the first limit stop 260 and the second limit stop 270 of the body 110. The first limit stop 260 and the second limit stop 270 are configured for restricting the movement of the plunger 200 in an upward or in a downward direction. The upper end 290 of the plunger 200 is positioned in communicating relation with the control button 240 to increase or decrease the degree of tension applied to the first ball 110 by sliding the control button 240 either towards or away from the first opening 135 to adjust the sensitivity of the haptic feedback and/or the accuracy when writing on the touch-sensitive surface S. It is to be noted that the control button 240 can have a plurality of different settings along the body 120 to adjust the pressure applied on the first ball 110.

The plunger tip 220 can be formed from any type of suitable material, such as plastic or other material that can withstand the downward pressure exerted by the plunger 200. Further, as illustrated in FIGS. 3A, 3B, the lower end 210 of the plunger 200 can be positioned in communicating relation with the hub 225. The guide assembly 250 may have having a first guide member 253 and a second guide member 255. The guide assembly 250 is configured for maintaining the inverted cradle 160, the second ball 140, and the first ball 110 aligned to prevent any unnecessary displacement when the first ball 110 of the touch pen 100 is communicating with the touch-sensitive surface S, such as when the touch pen 100 is being used to write and/or draw on the touch-sensitive surface S.

The resilient member 230 can be any suitable type of resilient member known in the art, such as a spring. It is to be noted that the plunger 200 can include at least one protruding member 203 (FIG. 2) configured for compressing the resilient member 230 against the third limit stop 280, such as when downward pressure is exerted on the plunger 200. As illustrated in FIG. 2, the resilient member 230 can be interposed between the at least one protruding member 203 positioned on the plunger 200 and the third limit stop 280 positioned in the interior portion 125 of the body 120. The resilient member 230 can be configured to provide proper alignment for the plunger 200, as well as to guard against any unwanted or undesired movement of the plunger 200 within the body 120 of the touch pen 100, such as when the touch pen 100 is being used.

As the plunger 200 moves toward the first opening 135, such as when the control button 240 is pressed or is moved toward the first opening 135 along the body 120, the at least one protruding member 203 positioned on the plunger 200, such as along the side of the plunger 200, moves toward the third limit stop 280 and compresses the resilient member 230 to control the stress level as the first ball 110 moves or rotates along the touch-sensitive surface S. When the control button 240 is released or moved away from the first opening 135, the resilient member 230 expands, allowing the plunger 200 to move away from the first opening 135 and return to its original position.

By way of operation, upon grabbing the touch pen 100 the user can move the control button 240, positioned in communicating relation with the plunger 200, by pressing downward on the control button 240 or sliding the control button 240 downward along the body 120 toward the first opening 135. As the plunger 200 moves downward, the plunger tip 200 exerts pressure upon the inverted cradle 160, which, in turn, causes the plurality of arms 170 to extend radially around the second ball 140, as illustrated in FIG. 5, so that each of the plurality of third balls 150 can be positioned around the second ball 140 to increase the frictional force exerted on the first ball 110 and ensure smooth and accurate operation of the touch pen 100. The increase in friction force between the second ball 140 and the first ball 110, in turn, increases the resistance, which sets the default level of the vibration and the haptic feedback experienced by the user of the touch pen 100.

When the user of the touch pen 100 applies the pen 100 to a touch sensitive surface S, either to write, to scroll down a page, to push a virtual button, or perform any other input operation permitted on a touch-sensitive surface S, pressure is applied to the first ball 110, which translates to the second ball 140, which bears against the inverted cradle 160a, 160b, causing the arms 170 to spread radially and extend the third balls 150 radially to roll towards the circumference of the second ball 140, thereby altering the haptic feedback through the body 120 of the pen 100.

It is to be noted that since a comfortable degree of vibration and haptic feedback is subjective and depends on each user's personal preference, it is to be noted that each user can adjust the amount of pressure exerted on the first ball 110 by sliding the control button 240 up or down to either increase or decrease the vibration and haptic feedback, respectively, experienced by the user resulting from writing and/or drawing on the touch sensitive surface S.

It is to be understood that the present invention is not limited to the embodiments described above, but encompasses any and all embodiments within the scope of the following claims.

I claim:

1. A touch pen with haptic feedback, comprising:
   an elongate hollow pen body having a contact end and an opening defined in the contact end;
   a surface contact ball disposed in the contact end of the pen body, a portion of the contact ball protruding through the opening in the contact end, the surface contact ball being adapted for rolling contact with a touch-sensitive surface of a touch screen electronic device;
   a bearing ball disposed in the contact end of the pen body above the surface contact ball, the bearing ball bearing against the surface contact ball;
   an inverted cradle having a central hub and a plurality of arms extending from the hub, each of the arms having a distal end, each of the arms being flexibly attached to the hub;
   a plurality of haptic balls, each of the cradle arms having a corresponding one of the haptic balls mounted at the distal end, the hub, the arms, and the haptic balls defining a cone having an apex at the hub and an expandable and contractible base defined by the haptic balls; and
   a tension-adjusting plunger slidably mounted in the pen body, the plunger having a tip bearing against the central hub of the cradle;
   wherein pressure applied to the surface contact ball when the pen is applied to the touch-sensitive surface is translated into reciprocating movement of the bearing ball against the haptic balls, extending the haptic balls radially to expand the base of the cone and altering haptic feedback mediated by the pen body.

2. The touch pen according to claim 1, wherein said plunger has a head and said pen body has an upper limit stop and a lower limit stop, the plunger head being restricted to sliding movement between the upper and lower limit stops to restrict sliding movement of the plunger inside said pen body.

3. The touch pen according to claim 1, further comprising a bias spring disposed in the pen body, the bias spring urging the plunger tip away from the cradle hub.

4. The touch pen according to claim 3, wherein the bias spring comprises a helical compression spring coaxially disposed around the plunger.

5. The touch pen according to claim 2, wherein the head of said plunger further comprises a flange, the flange being disposed between the upper limit stop and the lower limit stop in said pen body.

6. The touch pen according to claim 1, further comprising a control button disposed on the body, the control button being attached to the plunger, the control button being slidable to control initial tension applied by the haptic balls.

7. The touch pen according to claim 1, further comprising a guide assembly mounted in the contact end of the pen body for maintaining vertical alignment of the inverted cradle, the bearing ball, and the surface contact ball.

8. The touch pen with haptic feedback according to claim 1, wherein the surface contact ball comprises a metal ball having a rubber covering.

9. The touch pen according to claim 1, wherein the bearing ball comprises a ball made from plastic material.

10. The touch pen according to claim 9, wherein the plastic material comprises a porous material.

11. The touch pen according to claim 1, wherein each of the plurality of haptic balls comprises a rubber covering.

12. The touch pen according to claim 1, wherein each of the cradle arms is resiliently attached to the central hub.

13. The touch pen according to claim 1, wherein each of the cradle arms is resiliently attached to the central hub.

* * * * *